US006982630B2

(12) United States Patent
Beckwith et al.

(10) Patent No.: US 6,982,630 B2
(45) Date of Patent: Jan. 3, 2006

(54) VIBRATING PEDESTRIAN PUSH BUTTON STATION

(75) Inventors: Leslie A. Beckwith, La Mirada, CA (US); Wayne L. Russell, Ontario, CA (US)

(73) Assignee: Polara Engineering, Inc., Fullerton, CA (US)

( * ) Notice: Subject to any disclaimer, the term of this patent is extended or adjusted under 35 U.S.C. 154(b) by 79 days.

(21) Appl. No.: 10/749,848

(22) Filed: Jan. 2, 2004

(65) Prior Publication Data

US 2005/0145472 A1 Jul. 7, 2005

(51) Int. Cl.
*H04B 3/36* (2006.01)
*G08B 3/00* (2006.01)
*G08G 1/07* (2006.01)
*G08G 1/095* (2006.01)

(52) U.S. Cl. ............................... 340/407.1; 340/384.1; 340/388.1; 340/925; 340/944

(58) Field of Classification Search ............ 340/407.1, 340/925, 944, 929, 388.1, 384.1, 825.46; 200/61.45 R, 51.16, 302.1, 302.2, 510, 511
See application file for complete search history.

(56) References Cited

U.S. PATENT DOCUMENTS

| | | | | |
|---|---|---|---|---|
| 4,590,474 | A * | 5/1986 | Patterson et al. | 340/944 |
| 4,851,836 | A * | 7/1989 | Wilkinson et al. | 340/944 |
| 5,103,223 | A * | 4/1992 | Humphrey | 340/944 |
| 5,172,092 | A * | 12/1992 | Nguyen et al. | 340/7.58 |
| 5,339,071 | A * | 8/1994 | Eckhaus | 340/685 |
| 6,340,936 | B1 * | 1/2002 | McGaffey et al. | 340/944 |

* cited by examiner

*Primary Examiner*—Jeffery Hofsass
*Assistant Examiner*—Lam Pham
(74) *Attorney, Agent, or Firm*—Morland C. Fischer

(57) ABSTRACT

A vibrating push button station to be associated with a standard traffic signal of the kind used to control vehicular traffic at an intersection so that visually impaired pedestrians will be alerted when the pedestrian WALK signal is illuminated after first pressing a push button. The push button station includes an electromagnetic assembly that is adapted to generate a changing magnetic field following the depression of the push button. A magnet coupled to the push button by way of a flexible diaphragm is either pulled towards and repelled or simply released by the electromagnetic assembly as the magnetic field changes. The opposite movements of the magnet relative to the electromagnetic assembly is transmitted to the push button as a vibration so that the hand of a user will receive a tactile indication at the push button when vehicular traffic has been halted.

17 Claims, 3 Drawing Sheets

VIBRATING PEDESTRIAN PUSH BUTTON STATION

BACKGROUND OF THE INVENTION

1. Field of the Invention

This invention relates to a vibrating push button station to be associated with a traffic signal of the kind that is found at an intersection to control vehicular traffic so that pedestrians may cross the intersection once the traffic has been halted. The vibrating push button station of this invention has particular application for generating a tactile feedback signal by which to inform visually impaired pedestrians when the intersection may be crossed.

2. Background Art

It is common to combine a visual display with a traffic signal that is located at an intersection to control vehicular traffic and thereby enable pedestrians to cross the intersection. That is to say, the usual visual display conveys both a written message (i.e., WALK or DON'T WALK) as well as a color sensitive message (i.e., red or white) to instruct pedestrians when to cross the intersection. However, such visual warnings are of little value to those pedestrians who are visually impaired. Consequently, a visually impaired pedestrian who activates the push button of a traffic signal will have no way to accurately know when the intersection has been cleared of traffic so that it is time to cross.

To overcome this pervasive problem, a push button station was invented that is capable of generating a tactile feedback signal (i.e., a vibration) to alert visually impaired pedestrians to cross a traffic signal controlled intersection at the same time that the WALK message is being displayed. This push button station is disclosed in detail in U.S. Pat. No. 6,340,936 issued Jan. 22, 2002 and assigned to the assignee of this application.

In general terms, U.S. Pat. No. 6,340,936 describes a novel push button station having an electromagnetic assembly that generates a signal by which to vibrate a push button after the push button has first been depressed by a visually impaired pedestrian. A piezoelectric member is responsive to the pressure that is applied by the pedestrian to depress the push button. The piezoelectric member generates an output voltage to be received by an external control circuit which ultimately causes the traffic signal to change and the push button to vibrate. The patented push button station includes a solenoid to transfer the pushing force applied by the pedestrian from the push button to the piezoelectric element. More particularly, a magnetic flux that is generated after the push button is depressed causes an armature of the solenoid to move back and forth and repeatedly strike the button.

It is now desirable to eliminate the solenoid which is a part of the patented push button station that has been described above so that the push button station can have a more simplified, efficient and reliable electromagnetic vibrating assembly.

SUMMARY OF THE INVENTION

Disclosed herein is a vibrating push button station to be associated with a standard traffic signal (i.e., a stop light) of the kind that is used to control vehicular traffic at an intersection so that visually impaired pedestrians will be alerted when to cross the intersection a certain time after first pressing a push button. The push button station includes an efficient and reliable electromagnetic assembly that is adapted to cause the push button to vibrate so that a visually impaired pedestrian who holds his hand on the push button will receive a tactile feedback signal at the same time that the pedestrian WALK signal is illuminated.

The vibrating push button station includes a hollow mounting base having a flexible diaphragm extending across the open top thereof. A pedestrian activated push button is affixed to one side of the flexible diaphragm to receive a pushing force thereagainst, and a magnet holder is affixed to the opposite side of the diaphragm. A magnet is located inside the magnet holder to be displaced with the flexible diaphragm in response to a pushing force applied to the push button. A stationary coil housing is suspended within the mounting base so as to lie below the magnet holder. A coil is disposed within the coil housing in axial alignment with the magnet in the magnet holder. A piezoelectric disk is mounted at the top of the coil housing so as to lie in spaced, axial alignment with the magnet holder. A printed circuit board is bonded to the bottom of the coil housing and connected to the piezoelectric disk by means of flex circuitry. The printed circuit board is interconnected with an external control circuit by means of electrical wires that extend through an exit port formed at the bottom of the mounting base.

In operation, a pedestrian wishing to cross a traffic signal controlled intersection depresses the push button of the vibrating push button station. The pushing force is transferred from the push button to the flexible diaphragm to cause the diaphragm to bend and the magnet holder connected to the diaphragm to move towards and exert a force on the piezoelectric disk that is mounted on the coil housing. Accordingly, the piezoelectric disk will now flex so as to generate an output voltage which is detected by a comparator on the printed circuit board. The comparator provides a switching signal to the external control unit in response to the output voltage generated by the piezoelectric disk, whereby to cause the traffic signal to halt vehicular traffic moving through the intersection. When it is ultimately time for a pedestrian to cross and the pedestrian WALK signal is illuminated, a pulsating current is supplied to the coil within the stationary coil housing to create a magnetic field. As the magnetic field changes, the magnet within the magnet holder will be either repeatedly pulled towards and repelled or simply released by the coil, whereby the magnet holder will be subjected to a reciprocal movement which, in turn, will cause the push button that is connected to the magnet holder by the flexible diaphragm to pulse or vibrate. Accordingly, a visually impaired pedestrian will receive a tactile feedback signal at the push button of the vibrating push button station to indicate when the controlled intersection may be entered.

DETAILED DESCRIPTION

Figure 1:
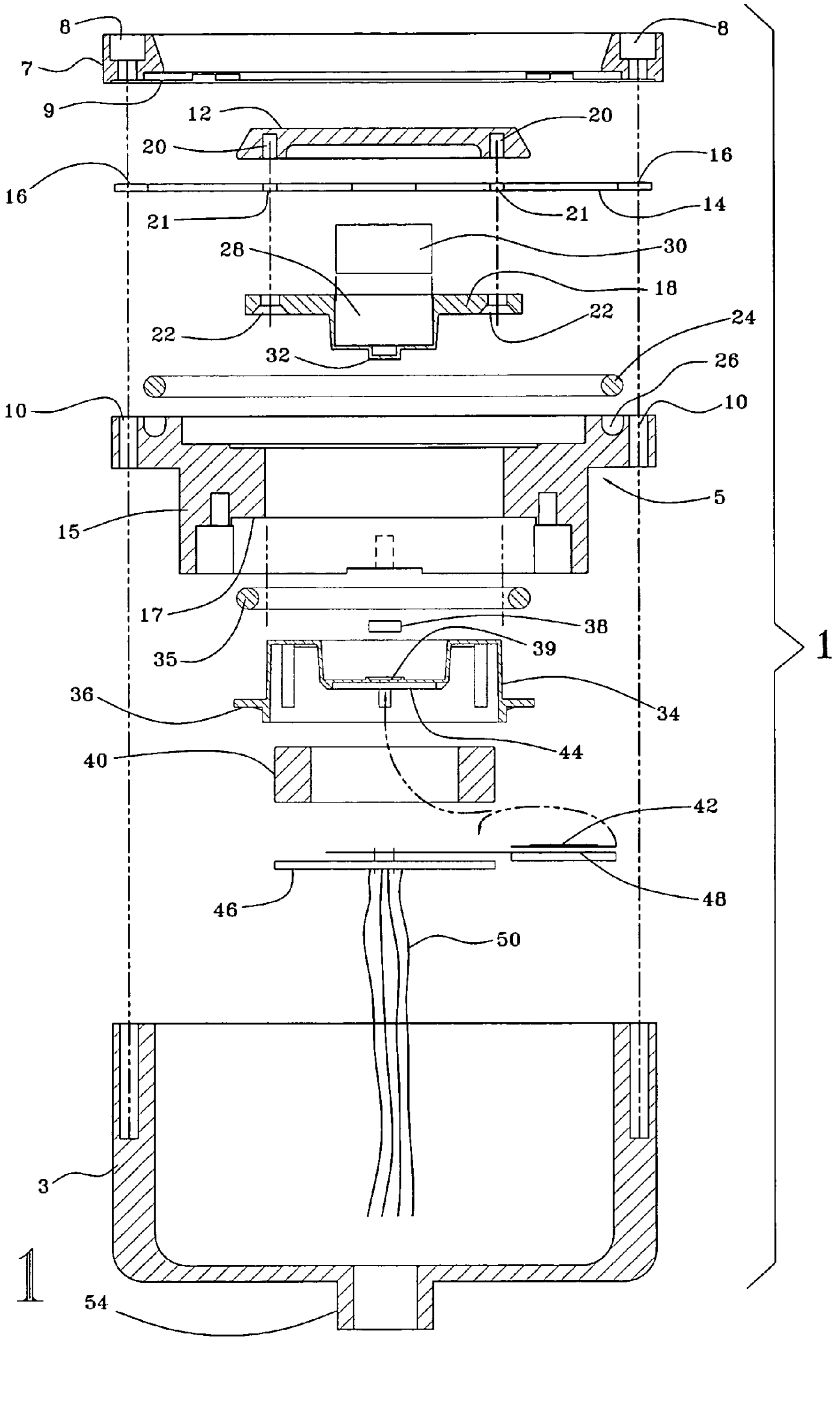
FIG. 1 is an exploded view of the vibrating pedestrian push button station which forms the preferred embodiment of the present invention.
Figure 3:
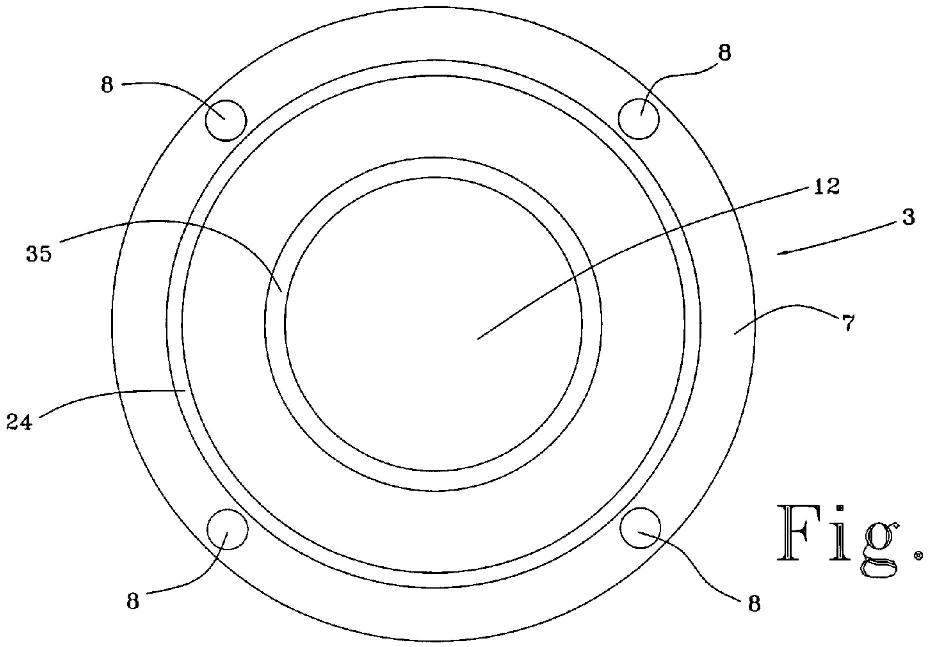
FIG. 3 is a top view of a mounting base from the vibrating pedestrian push button station of FIG. 2.

The vibrating push button station 1 of this invention that is capable of providing a tactile feedback signal to help visually impaired pedestrians cross an intersection that is controlled by a traffic signal (i.e., a stop light) is described while referring concurrently to FIGS. 1–4 of the drawings. The push button station 1 includes a hollow mounting base 3 within which to receive an electromagnetic assembly that is responsive to a mechanical pressure initiated by a visually impaired pedestrian wishing to enter an intersection after vehicular traffic has been stopped by the traffic signal. A push button frame 5 is seated upon the open top of base 3 so as to support an external cover (e.g., ring 7) which surrounds the push button 12. In the alternative, the base 3 can be eliminated by connecting the frame 5 and ring 7 directly to a panel (not shown) or other existing structure. As is best shown in the assembled configuration of FIG. 2, the push button frame 5 includes a body 15 that projects downwardly into the base 3 so as to receive the electromagnetic assembly therewithin in a manner that will be described in detail hereinafter.

A set of through holes 8 and 10 (best shown in FIG. 4) is formed through each of the cover ring 7 and the push button frame 5. In the assembled configuration of FIG. 2, the through holes 8 and 10 of ring 7 and push button frame 5 are axially aligned so as to receive suitable fasteners (designated 11 in FIG. 4) by which to affix the ring 7 at the top of the base 3 so as to lie above and surround the body 15 of push button frame 5.

The external cover ring 7 also surrounds a raised pedestrian activated push button 12. The push button 12 may have a raised arrow or another symbol (not shown) formed thereon to help the visually impaired pedestrian determine the direction of travel when entering the intersection. A disk-like diaphragm 14 is held between the cover ring 7 and the push button frame 5. Diaphragm 14 is preferably manufactured from a thin (e.g., 0.008 inches) piece of metal (e.g. stainless steel) so as to have a flexible spring-like characteristic. A set of (e.g., four) tabs 16 (best shown in FIG. 4) project outwardly from the periphery of diaphragm 14 for receipt within relief slots (designated 9 in FIG. 1) that are formed in the cover ring 7, whereby the flexible diaphragm 14 is suspended between cover ring 7 and push button frame 5. A resilient O-ring or soft rubber sponge material (not shown) can be installed inside the cover ring 7 to allow for greater diaphragm movement.

Figure 2:
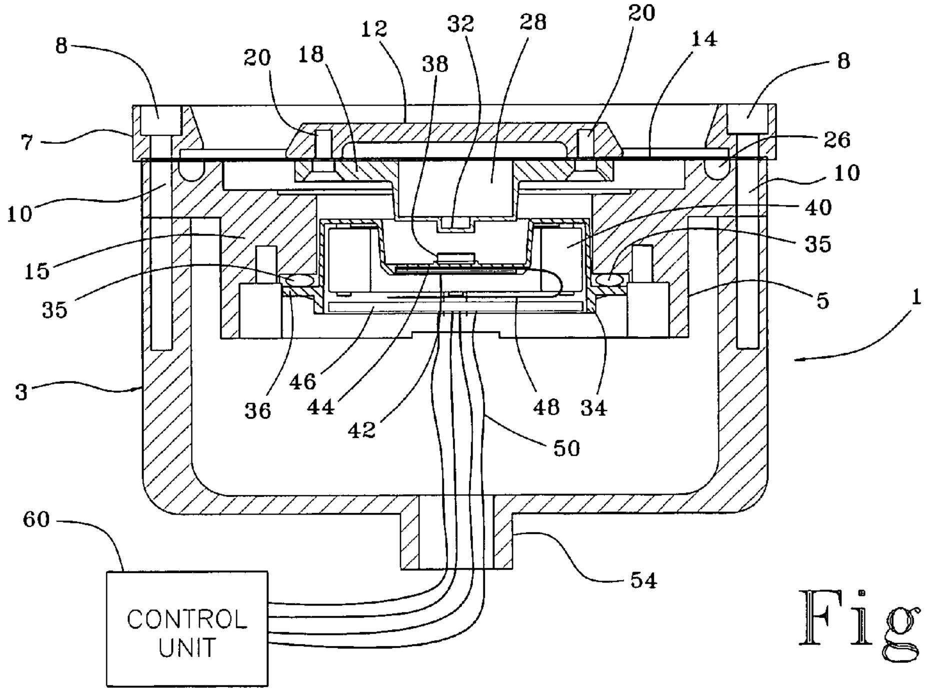
FIG. 2 is a cross-section of the vibrating push button station of FIG. 1 in the assembled configuration.

In the assembled configuration of FIG. 2, the push button 12 is seated upon the outwardly facing side of diaphragm 14. A magnet holder 18 is positioned against the inwardly facing side of diaphragm 14 so as to lie below push button 12. Sets of axially aligned holes 20, 21 and 22 are respectively formed through each of the push button 12, the diaphragm 14, and the magnet holder 18 to receive suitable fasteners (designated 23 in FIG. 4) in order to preserve the face-to-face alignment of the push button 12 and the magnet holder 18 at opposite outwardly and inwardly facing sides of the flexible diaphragm 14. By virtue of the flexible nature of the diaphragm 14, the push button 12 and the magnet holder 18 at opposite sides of diaphragm 14 are adapted to be displaced as a unit vertically through the mounting cup 3 in response to a pushing force applied to the push button 12 by a pedestrian. An optional O-ring 24 is received within a circumferential groove 26 which extends around the body 15 of push button frame 5 below the diaphragm 14 to isolate the body 15 of push button frame 5 from external moisture, dirt and other contaminates. The O-ring 24 also provides a flexible surface to support the diaphragm 14.

Figure 4:
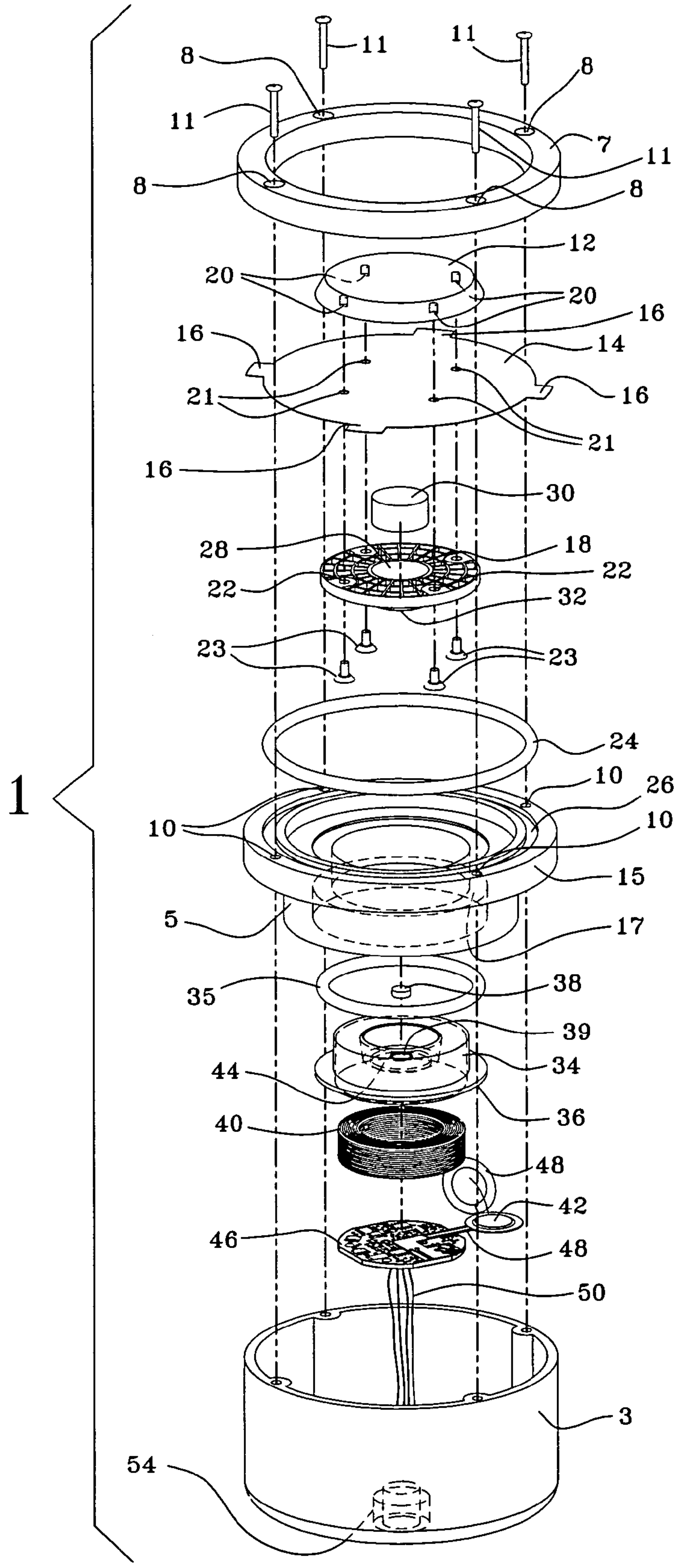
FIG. 4 is another exploded view of the vibrating push button station in perspective.

The magnet holder 18 includes a cavity 28 within which to receive a magnet (designated 30 in FIGS. 1 and 4). The magnet 30 can be formed from any suitable magnetic material (e.g., neodymium) with a preferred size of about 0.75 inches×0.375 inches. A commercially available magnet that is suitable for use herein is manufactured by All Magnetics under Part No. ND142N-35. A dimple 32 projects downwardly from the bottom of magnet holder 18 so as to lie below the magnet 30. In the assembled configuration of FIG. 2, the magnet holder 18 is suspended below the flexible diaphragm 14 so that the cavity 28 within which the magnet 30 is located is received downwardly through the body 15 of push button frame 5.

A stationary coil housing 34 is also located within the body 15 of push button frame 5 so as to lie below the magnet holder 18. Coil housing 34 includes a peripheral lip 36 that is seated below a ledge 17 at the bottom of the button frame body 15. An O-ring seal 35 surrounds the coil housing 34 so as to lie between the lip 36 thereof and the ledge 17 of body 15. A resilient (e.g., silicon foam rubber) bumper 38 is bonded to a nest 39 at the top of coil housing 34 so as to lie in spaced alignment opposite the dimple 32 projecting downwardly from the bottom of magnet holder 18. In this manner, the push button 12, the magnet holder 18, and the coil housing 34 are all held in axial alignment with one another within the base 3. Therefore, a pushing force that is applied to the push button 12 of push button station 1 by a pedestrian will cause the flexible diaphragm 14 to bend inwardly through the base 3 so that the magnet holder 18 that is carried at the inwardly facing side of diaphragm 14 will be displaced vertically through the push button frame 5 so that the dimple 32 which projects downwardly from the magnet holder 18 will apply a force against the bumper 38 that projects upwardly from the stationary coil housing 34.

A coil 40 is located within the stationary coil housing 34 below the movable magnet holder 18 so as to surround the magnet 30. By way of example, the coil 40 preferably has between 300 to 1000 turns of copper magnet wire with an insulation layer of polyurethane nylon covered by an adhesive (e.g., polyvinyl butyeral) coating. The coil 40 can be pulsed with either an AC or a DC current for a purpose that will soon be disclosed. By way of example only, a 15 volt DC voltage source is used to pulse coil 40 at a frequency of 20 Hz.

According to the preferred embodiment, a piezoelectric disk 42 (best shown in FIG. 4) is located within a disk cavity 44 of the coil housing 34 so as to lie below the resilient bumper 38. By way of example, piezoelectric disk 42 is a 20 mm disk that is commercially available under Part No. 2-203911 from American Piezo. However, it is to be recognized that other force sensitive switches (e.g., a membrane switch or a microswitch) can be substituted for piezoelectric disk 42. The resilient bumper 38 above piezoelectric disk 42 is capable of both protecting disk 42 from damage due to mechanical shock while transmitting a pressure to disk 42 that corresponds to the force received by bumper 38 when the push button 12 is depressed by a pedestrian and the magnetic holder 18 carried by the flexible diaphragm 14 is displaced vertically towards the stationary coil housing 34 in response thereto.

The piezoelectric disk 42 is suspended from and electrically connected to a printed circuit board 46 (also best shown in FIG. 4) by means of flex circuitry 48. The flex circuitry 48 allows the position of piezoelectric disk 42 to be spaced from and manipulated relative to the printed circuit board 46 for receipt within the disk cavity 44 of coil housing 34. The function of circuit board 46 is to convert an output voltage generated by the piezoelectric disk 42 to an electric switching signal that is indicative of the pushing force applied to push button 12 and the corresponding pressure that is generated when the dimple 32 of magnet holder 18 applies a force to the bumper 38 of stationary coil housing 34. In this same regard, when the pushing force is no longer applied to push button 12, the spring memory of flexible diaphragm 14 will cause the magnet holder 18 and the dimple 32 projecting downwardly therefrom to automatically move away from the coil housing 34 and out of contact with the resilient bumper 38 projecting upwardly therefrom, whereby pressure will no longer be applied to the piezoelectric disk 42 via bumper 38.

As piezoelectric disk 42 flexes in response to the pressure applied thereto by the dimple 32 of magnet holder 18 when push button 12 is depressed, the output voltage generated by disk 42 is supplied to a comparator on circuit board 46. The comparator compares the voltage generated by piezoelectric disk 42 with a predetermined reference voltage and then provides an output switching signal to indicate that push button 12 has been depressed.

A minimum of four wires 50 are connected to the printed circuit board 46 to provide the vibrator input and to receive the output switching signal from the comparator on circuit board 46 in response to the voltage generated by the piezoelectric disk 42 after the push button 12 is first depressed and the disk 42 is subsequently flexed. The wires run from the circuit board 46 to an external control unit 60 by way of an exit port 54 that projects from the bottom of the mounting base 3. The control unit 60 can be located at the push button station 1 or in the remote intersection control cabinet. Accordingly, the external control unit 60 receives the switching signal from circuit board 46 to cause the traffic signal to initiate its usual sequence to halt the flow of vehicular traffic through the intersection. At the same time, the switching signal also activates a timer at control unit 60 that can be set to any predetermined time following the depression of push button 12 before a tactile signal will be fed back to the push button 12 to indicate when to cross the controlled intersection. For example, the predetermined time can be set to expire at the same time that the usual WALK message is displayed.

In this regard, once the timer of control unit 60 times out, the coil 40 within the stationary coil housing 34 will be pulsed by a voltage source from control unit 60 such that a pulsed current will flow through coil 40 to create a corresponding magnetic field. As the polarity of the magnetic field changes, the magnet 30 within magnet holder 18 will be attracted to and repelled by coil 40. In the alternative, the current may be simply interrupted, whereby the magnet 30 will be released from coil 40 when the magnetic field changes. Thus, the magnet holder 18 will be subjected to successive (e.g., push-pull) forces so as to move in opposite directions through the body 15 of push button frame 5 towards and away from the stationary coil housing 34.

As was described above, the magnet holder 18 and the push button 12 are secured to opposite sides of the flexible diaphragm 14. Therefore, the reciprocal movement of magnet holder 18 will be transferred to the flexible diaphragm 14 and, in turn, to the push button 12. A pedestrian who places his hand on the push button 12 will now feel a vibration a particular time after the push button is first depressed. For a visually impaired pedestrian, the vibration functions as a tactile feedback signal to inform the pedestrian when to cross the intersection that is controlled by the traffic signal with which the vibrating push button station 1 of this invention is associated.

The electromagnetic assembly described above enables a highly efficient and more reliable vibrating push button station to be achieved at which to provide a tactile feedback signal to alert visually impaired pedestrians when to cross a traffic signal controlled intersection a certain time after a push button is first depressed. In this case, the magnet 30 and the magnet holder 18 are attached to and movable with the flexible diaphragm 14. The magnet 30 is coaxially aligned with the coil 40 so that when a pulsed current flows through the coil, the magnet holder 18 will be pulled inwardly or pushed outwardly to create a vibration. By virtue of the foregoing, the electromagnetic assembly of vibrating push button station 1 is able to convert electromagnetic energy into motion more efficiently than the solenoid assembly employed by the vibrating push button station of U.S. Pat. No. 6,340,936. That is, unlike a solenoid assembly, the electromagnetic assembly used in the push button station 1 requires no bearing surfaces and, therefore, is not subjected to energy loss caused by friction. The reliability of push button station 1 is enhanced, inasmuch as there is no need for lubrication or waterproofing, and the lack of bearing surfaces reduces the likelihood that push button station 1 will jam or wear out.

Although the vibrating push button station 1 described herein has particular application for generating a tactile feedback signal by which to alert a visually impaired pedestrian when to enter an intersection (e.g., when the WALK signal is illuminated), it is to be understood that push button station 1 may also be used for other touch sensitive applications (e.g., such as in the operation of machinery, during automated manufacturing or chemical processes, and the like) wherein a tactile feedback signal is provided at a predetermined time after a push button is first depressed to notify operators that an independent step or process has been completed. Thus, push button station 1 may be engaged by operators whose visual attention is primarily focused towards a job site, such that the operators must rely on a tactile signal to indicate when an action affecting the job site must be initiated or changed.

We claim:

1. A vibrating push button station at which a tactile signal is produced, said vibrating push button station comprising:

a frame;

a flexible diaphragm mounted on said frame and having opposite outwardly and inwardly facing sides;

a pushing surface to which a force is applied by a user, said pushing surface located on the outwardly facing side of said flexible diaphragm;

a magnet coupled to the inwardly facing side of said flexible diaphragm;

an electromagnetic assembly supported by said frame so as to lie below and in spaced alignment with said magnet; and means to pulse said electromagnetic assembly and thereby generate a corresponding changing magnetic field so as to cause said magnet and said flexible diaphragm coupled thereto to move towards and away from said electromagnetic assembly, the movements of said magnet relative to said electromagnetic assembly being transmitted as a vibration to said pushing surface at the outwardly facing side of said flexible diaphragm.

2. The vibrating push button station recited in claim 1, wherein said pushing surface is a push button connected to the outwardly facing side of said flexible diaphragm, said vibration being transmitted to the hand of the user at said push button.

3. The vibrating push button station recited in claim 1, wherein said electromagnetic assembly includes a coil to be pulsed so as to generate said changing magnetic field, said magnet moving towards and away from said coil.

4. The vibrating push button station recited in claim 3, wherein said electromagnetic assembly also includes a stationary coil housing supported by said frame so as to receive and retain said coil in spaced alignment below said magnet for producing said vibration at said pushing surface.

5. The vibrating push button station recited in claim 4, further comprising a magnet holder attached to the inwardly facing side of said flexible diaphragm so as to receive said magnet, said magnet holder and said magnet therewithin moving towards and away from the coil within said stationary coil housing.

6. The vibrating push button station recited in claim 5, further comprising a force sensitive device mounted on said stationary coil housing, said magnet holder moving towards said coil housing so as to apply a force to said force sensitive device and thereby cause said force sensitive device to supply a signal for causing the coil of said stationary coil housing to be pulsed and said changing magnetic field to be generated.

7. The vibrating push button station recited in claim 6, wherein said force sensitive device is a piezoelectric element and the signal supplied thereby is a voltage.

8. The vibrating push button station recited in claim 7, wherein said piezoelectric element is located within a cavity formed in said stationary coil housing so as to lie in spaced axial alignment with said magnet holder.

9. The vibrating push button station recited in claim 8, including an elastomeric bumper mounted on said stationary coil housing outside the cavity within which said piezoelectric element is located, said bumper transmitting to said piezoelectric element the force applied by the user to the pushing surface of said flexible diaphragm for causing said magnet holder to move towards and apply said force to said piezoelectric element.

10. The vibrating push button station recited in claim 7, further comprising a circuit board electrically interconnected to said piezoelectric element to receive the voltage supplied by said piezoelectric element and produce a switching signal in response thereto, said switching signal being applied to said means to pulse the coil of said electromagnetic assembly, whereby said coil is pulsed and said changing magnetic field is generated.

11. The vibrating push button station recited in claim 1, wherein said frame has an open top, said flexible diaphragm extending across said open top to be suspended therefrom, said pushing surface and said magnet at the opposite facing sides of said diaphragm moving in unison relative to said frame towards said electromagnetic assembly in response to the force applied by the user to said pushing surface.

12. A vibrating push button station to provide a tactile signal to a user, said vibrating push button station comprising:

a push button to which a pushing force is applied by the user;

a permanent magnet coupled to said push button;

a coil axially aligned with and spaced longitudinally from said permanent magnet to which a current is applied to generate a changing magnetic field and thereby cause the permanent magnet to be pulled towards and then moved away from said coil, the movements of said permanent magnet towards and away from said coil being transmitted to said push button as said tactile signal; and a force sensitive element spaced from and aligned with said magnet, said permanent magnet moving towards said force sensitive element to apply a force thereto in response to the pushing force applied by the pedestrian to said push button, said force sensitive element generating an output signal when said permanent magnet moves into contact therewith for causing the current to be applied to said coil.

13. The vibrating push button station recited in claim 12, further comprising a flexible diaphragm having opposite first and second sides, said push button coupled to the first side of said flexible diaphragm and said permanent magnet coupled to the second side of said flexible diaphragm, said flexible diaphragm flexing when said pushing force is applied by the pedestrian to said push button for moving said permanent magnet into contact with said force sensitive element, and the movements of said permanent magnet towards and away from said coil correspondingly pulling and pushing said flexible diaphragm with said permanent magnet for causing said flexible diaphragm to flex and thereby transfer the tactile signal to said push button.

14. The vibrating push button station recited in claim 12, wherein said force sensitive element is a piezoelectric element and said output signal is a voltage generated by said piezoelectric element for causing the current to be applied to said coil when said permanent magnet moves towards said piezoelectric element to apply said force thereto.

15. The vibrating push button station recited in claim 14, further comprising a circuit board to receive the voltage generated by said piezoelectric element for causing the current to be applied to said coil, said piezoelectric element electrically connected to and spaced from said circuit board by means of flexible electrical circuitry extending therebetween.

16. The vibrating push button station recited in claim 12, further comprising a coil housing so as to receive and retain said coil in spaced axial alignment with said permanent magnet so that said permanent magnet moves relative to said coil when said current is applied to said coil.

17. The vibrating push button station recited in claim 1, wherein said magnet is a permanent magnet.

* * * * *